United States Patent
Iwamoto et al.

(10) Patent No.: US 9,268,021 B2
(45) Date of Patent: Feb. 23, 2016

(54) DETECTION DEVICE AND COMPUTER READABLE MEDIA STORING DETECTION PROGRAM

(75) Inventors: Makoto Iwamoto, Nishinomiya (JP); Satoshi Misonoo, Nishinomiya (JP); Yuriko Onishi, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 954 days.

(21) Appl. No.: 13/445,958

(22) Filed: Apr. 13, 2012

(65) Prior Publication Data

US 2012/0263017 A1  Oct. 18, 2012

(30) Foreign Application Priority Data

Apr. 14, 2011  (JP) ................................. 2011-090435

(51) Int. Cl.
*G01S 15/00* (2006.01)
*G01S 15/96* (2006.01)
*G01S 7/527* (2006.01)

(52) U.S. Cl.
CPC ........... *G01S 15/96* (2013.01); *G01S 7/527* (2013.01)

(58) Field of Classification Search
CPC ...... G01S 15/96; G01S 7/527; Y10S 367/901; Y10S 367/908
IPC .................. G01S 7/527, 15/96; Y10S 367/901, Y10S 367/908
See application file for complete search history.

(56) References Cited

U.S. PATENT DOCUMENTS

| 5,796,779 | A  | * | 8/1998 | Nussbaum et al. | ............ 375/267 |
| 8,314,732 | B2 | * | 11/2012 | Oswald et al. | ................... 342/90 |
| 2008/0069275 | A1 | * | 3/2008 | Horiguchi et al. | ............ 375/347 |
| 2008/0080316 | A1 | * | 4/2008 | Inouchi et al. | ................... 367/98 |
| 2008/0094274 | A1 | * | 4/2008 | Nakanishi | ........................ 342/91 |
| 2010/0159866 | A1 | * | 6/2010 | Fudge et al. | ................... 455/302 |
| 2011/0273963 | A1 | * | 11/2011 | Onishi et al. | .................... 367/93 |

FOREIGN PATENT DOCUMENTS

JP  2003-322678 A  11/2003

* cited by examiner

*Primary Examiner* — Luke Ratcliffe
*Assistant Examiner* — Hovhannes Baghdasaryan
(74) *Attorney, Agent, or Firm* — Global IP Counselors, LLP (57) ABSTRACT

This disclosure provides a detection device, which includes a transceiver for transmitting a transmission signal and receiving an echo caused by the transmission signal to output a reception signal according to an intensity of the echo, the reception signal in one measurement including one or more reception signals, and an interference detector for detecting an interference signal from the one or more reception signals. The interference detector performs a switching operation of switching interference detection processing between first interference detection processing and second interference detection processing that has a higher interference detection sensitivity than in the first interference detection processing, according to the number of the reception signals detected as the interference signals.

11 Claims, 8 Drawing Sheets

DETECTION DEVICE AND COMPUTER READABLE MEDIA STORING DETECTION PROGRAM

CROSS-REFERENCE TO RELATED APPLICATION(S)

The application claims priority under 35 U.S.C. §119 to Japanese Patent Application No. 2011-090435, which was filed on Apr. 14, 2011 the entire disclosure of which is hereby incorporated by reference.

TECHNICAL FIELD

The present invention relates to a device for transmitting and receiving a sound and/or an electromagnetic wave, and particularly relates to a detection device for detecting an echo and interference.

BACKGROUND OF THE INVENTION

Conventionally, devices, such as radar apparatuses and fish finders, for transmitting and receiving a sound and/or an electromagnetic wave perform various kinds of processing to remove interference caused by another device(s). For example, JP2003-322678A discloses a method using the fish finder, in which interference is detected based on whether a ratio of an amplitude of a reception signal from a measurement (current measurement) and an amplitude of a reception signal from a previous measurement is below a predetermined value.

The interference signal is unlikely detected continuously for a plurality of times at the same level and the same depth, T he method disclosed in JP2003-322678A determines that the current reception signal is interference if the ratio of the amplitudes is above the predetermined value (i.e., if an intensity difference between the reception signals is large) and displays it on a display unit using the previous reception signal.

However, because the method disclosed in JP2003-322678A determines as interference as long as the intensity difference is large, there has been a possibility that a reception signal that is a normal echo other than interference (a target object such as school of fish) may be determined as interference. On the other hand, in another method with lower detection sensitivity than the method disclosed in JP2003-322678A, there has been a possibility that even the reception signal that originally is interference may not be determined as interference.

SUMMARY OF THE INVENTION

Thus, the present invention is made in view of the above situations, and provides a detection device that can detect interference more accurately comparing to the conventional device without performing the interference removal more than needed.

According to one aspect of the invention, a detection device is provided. The detection device includes a transceiver for transmitting a transmission signal and receiving an echo caused by the transmission signal to output a reception signal according to an intensity of the echo, the reception signal in one measurement including one or more reception signals, and an interference detector for detecting an interference signal from the one or more reception signals. The interference detector performs a switching operation of switching interference detection processing between first interference detection processing and second interference detection processing that has a higher interference detection sensitivity than in the first interference detection processing, according to the number of the reception signals detected as the interference signals.

Thus, with the detection device of the invention, the interference detection processing with high detection sensitivity and the interference detection processing with low detection sensitivity are switched therebetween according to the number of the detected interference signals. The interference detection is not performed more than needed in a state with a small number of interference; therefore, the reception signal corresponding to a normal echo other than interference is not false detected as interference. Further, the interference detection with sensitivity high to some extent is performed in a state with a large number of interference; therefore, the reception signal that originally is interference is highly accurately detected as interference.

The detection sensitivity may be switched by switching a mode of interference detection to a different mode, and alternatively, by changing a repetition of interference detection processing in the same mode of interference detection.

In the case of switching the interference detecting mode between the different modes, a first interference detecting mode with low detection sensitivity may include processing for detecting that the reception signal from a current measurement is the interference signal under condition 1: when an intensity difference between the reception signals from the current measurement and the reception signal from a previous measurement is above a first intensity difference threshold. In other words, the part where the intensity difference with the part from the previous measurement at the same depth is above a predetermined threshold th is detected as interference. When the interference signal is inputted, because the same or similar intensity is not likely to be detected continuously at the same depth, the part where the intensity difference is moderate is detected as an echo from a target object other than interference. In this case, through appropriately setting the threshold th, a possibility that the part other than interference is false detected as interference becomes extremely low.

Whereas, a second interference detecting mode with high detection sensitivity may include processing for detecting that the reception signal from the current measurement is the interference signal under condition 2: when the reception signal from the current measurement has a higher intensity than that of the one or more reception signals from one or more previous measurements, condition 3: when the reception signal from the current measurement has an intensity above a predetermined intensity threshold, and, in addition, condition 4: when an intensity difference between the reception signal from the current measurement and the reception signal having a lowest intensity in the one or more previous measurements is above a predetermined threshold th. The detection sensitivity of the second interference detecting mode is higher than that in the first interference detecting mode.

Further, the switching operation may be performed with the second interference detecting mode using only conditions 2 and 3 and the first interference detecting mode using condition 4 in addition to the above conditions.

When the number of the reception signals detected as the interference signal is extremely small, the interference detection processing is performed with condition 1. When the number of the reception signals detected as the interference signal is extremely large, the interference detection processing is performed with conditions 2 and 3. When the number of the reception signals detected as the interference signal is intermediate between the above cases, the interference detection processing is performed using conditions 2, 3 and 4.

Further, the switching operation may be performed when the number of the reception signals from one measurement detected as the interference signals is above a predetermined threshold. Alternatively, the switching operation may be performed when the number of the reception signals from a plurality of measurements detected as the interference signals is above a predetermined threshold.

When the switching operation is determined from a plurality of reception signals from a plurality of measurements, the interference detector may perform the switching operation when the number of the reception signals detected as the interference signals continuously at the same depth is above a predetermined threshold. Alternatively, the interference detector may average the numbers of the reception signals over the plurality of measurements and, when the averaged number of the reception signals is above a predetermined threshold, the interference detector may perform the switching operation.

Note that, the interference signal may be formed with a plurality of reception signals continuous over a reference depth range in one measurement. Therefore, for example, when echoes from the same target object (e.g., fish moving in the depth direction) are detected in the current and previous measurements at depths far from each other, these echoes are not false detected as interference.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Next, an embodiment of the present invention is described with reference to the appended drawings.

Figure 1:
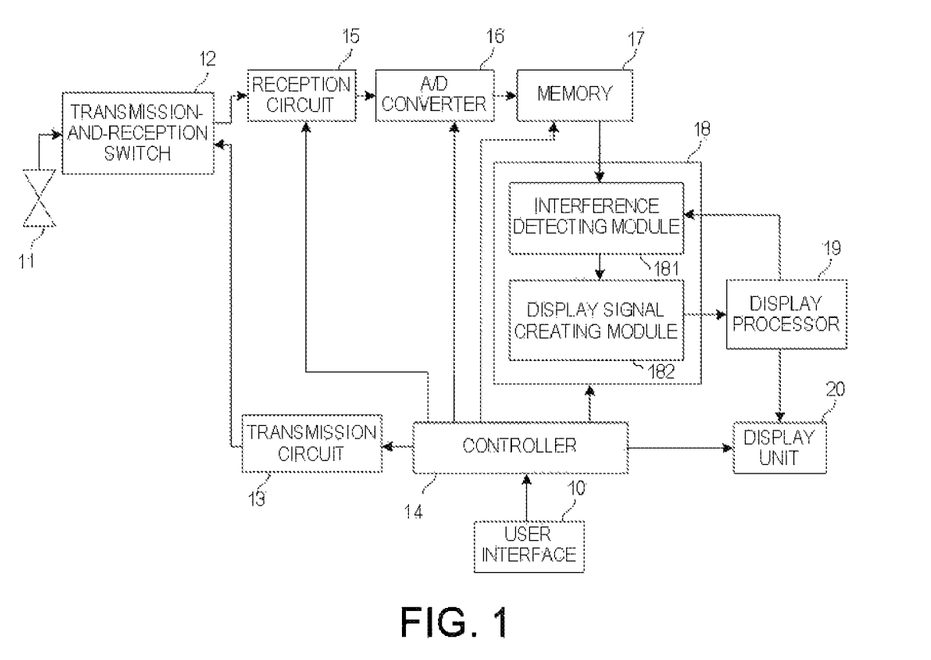
FIG. 1 is a block diagram showing a configuration of a fish finder according to an embodiment of the present invention.

FIG. 1 is a block diagram showing a configuration of a detection device utilized as a fish finder in this embodiment. The fish finder includes a user interface 10, a transducer 11, a transmission-and-reception switch 12, a transmission circuit 13, a controller 14, a reception circuit 15, an A/D converter 16, a memory 17, a signal processor 18, a display processor 19, and a display unit 20.

The controller 14 controls the fish finder overall. The controller 14 receives an instruction input, such as setting a detecting range, from the user interface 10. The controller 14 responds to the input to set a transmitting period from the transmission circuit 13 and the detecting range, set a corresponding period of a sampling pulse toward the A/D converter 16, generate write and read clocks and address for the memory 17, generate various processing signals to the signal processor 18 and the display processor 19, and transmit an instruction for executing calculation processing. The display unit 20 displays reception data for displaying by having a vertical axis of a display screen thereof as a depth direction and a horizontal axis thereof as a time direction.

The transmission circuit 13 inputs a pulse shaped signal to the transducer 11, which serves as a transceiver, via the transmission-and-reception switch 12 internally built with a trap circuit. The transducer 11 is an oscillator that is attached to, for example, a bottom of a ship, and outputs an ultrasonic wave (transmission signal) underwater in response to the pulse shaped signal inputted from the transmission circuit 13.

The ultrasonic wave outputted from the transducer 11 reflects on a target object such as fish or the sea bottom, and is received as echo signal(s). The transducer 11 outputs reception signal(s) corresponding to an intensity or intensities of the received echo(es) to the reception circuit 15 via the transmission-and-reception switch 12. The reception circuit 15 amplifies the inputted reception signal(s) and outputs them to the A/D converter 16. The A/D converter 16 converts each reception signal into a digital signal at a predetermined sampling rate and stores it sequentially in the memory 17.

Figure 2:
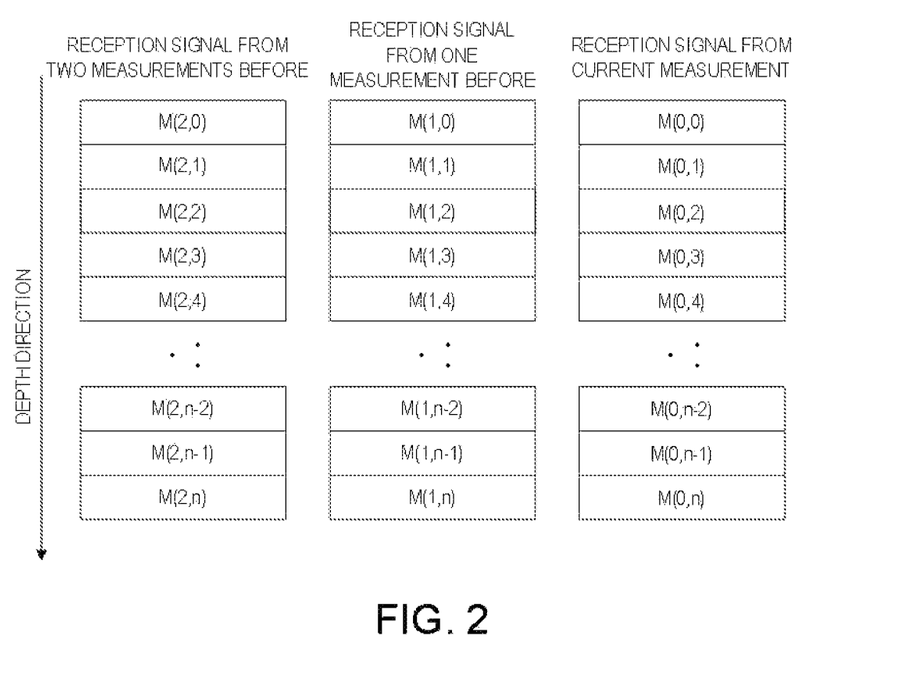
FIG. 2 is a table showing reception signals stored in a memory 17.

FIG. 2 is a table showing the reception signals stored in the memory 17. The memory 17 sequentially stores data of the reception signal(s) obtained in a single measurement at a predetermined resolution in the depth direction (at a predetermined time period after the transmission of the ultrasonic wave), and stores data columns corresponding to a plurality of measurements. For example, in the latest (current) measurement, data with the least time difference from the transmission to the reception (data at the shallowest depth comparing to other data in the column) is stored as M(0, 0) and, sequentially as M(0, 1) to M(0, n) at the resolution in the depth direction. Similarly, in a measurement of one measurement before (hereinafter, "one before" may be referred to as "previous"), data at the shallowest depth is stored as M(1, 0) and sequentially as M(1, 1) to M(1, n) at the resolution in the depth direction. Further similarly, in a measurement of two measurements before, data at the shallowest depth is stored as M(2, 0) and sequentially as M(2, 1) to M(2, n) at the resolution in the depth direction. Note that, although the example of storing the data columns from the three measurements (the measurements of current, previous, and two measurements before) is described in the FIG. 2, the number of stored data columns may be sequentially set according to a memory capacity. When the measurements are performed as many times as or more than the number of stored data columns, the oldest data column in the memory is sequentially erased, and is sequentially updated by the latest data column.

Next, the signal processor 18 converts the reception signals stored in the memory 17 into data so as to be displayed on the display unit 20. In other words, the signal processor 18 outputs to the display processor 19 the reception signal sequentially stored in the memory 17 as echo data corresponding to depth, according to the elapsed time period from the output of the ultrasonic wave.

Figure 3A:
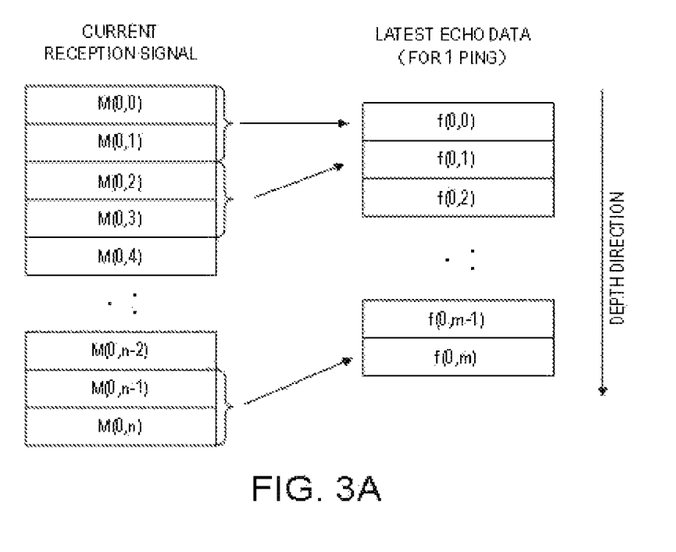
FIG. 3A is a table showing echo data and FIG. 3B is a table showing the echo data stored inside an image memory.
Figure 3B:
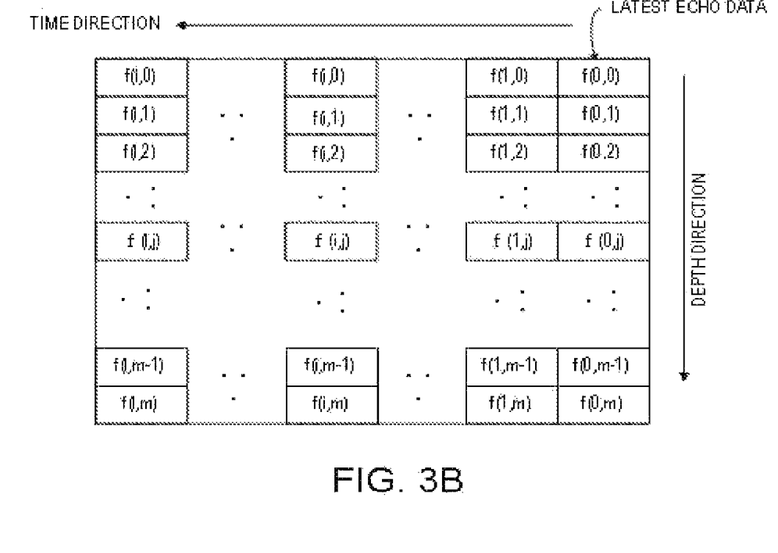

FIGS. 3A and 3B are tables showing the echo data. First, the signal processor 18 consolidates the reception signals read out from the memory 17, according to the number of pixels of the display unit 20 (the resolution of the display screen in the vertical direction). The consolidated data serves as the echo data for a single measurement (one ping). For example, as shown in FIG. 3A, in the reception signals M(0, 0) to M(0, n) from the latest measurement, M(0, 0) and M(0, 1) are averaged to create echo data f(0, 0) for the pixel corresponding to the shallowest depth position. The signal processor 18 sequentially averages the plurality of data of the reception signals and creates the echo data f(0, 0) to f(0, m) for the pixels. The echo data thus created becomes the echo data for the latest one ping. Note that, the number of consolidated data is not limited to the example shown in FIG. 3A. Further, the method of consolidating is not limited to averaging the data, and it may be, for example, weighting the data according to the respective depths or peak hold (extracting a maximum value).

The signal processor 18 performs interference removal processing (described later) by using the latest echo data consolidated as described above, and outputs the data to the display processor 19 to update contents of an image memory (RAM, not illustrated) of the display processor 19. The display processor 19 outputs to the display unit 20 the echo data stored in the updated image memory after the interference removal processing. As a result, the echo data for a plurality of pings are displayed on the display unit 20. Note that, the consolidation of the data is not necessarily performed, and, when the resolution of the screen image on the display unit 20 in the vertical direction is close to or the same as the resolution of the reception signal, the reception signal may be utilized as the echo data corresponding to each pixel as it is.

FIG. 3B is the view showing the echo data corresponding to the entire display screen. The image memory of the display processor 19 stores the echo data for all the pixels of the display unit 20, and the echo data is sequentially updated per each ping by the signal processor 18. The data at the right end in the display screen is the latest echo data and is stored from f(0, 0) to f(0, j) and further to f(0, m). Sequentially, the echo data according to the previous ping is stored from f(1, 0) to f(1, j) and further to f(1, m), the echo data according to the ping of i times before is stored from f(i, 0) to f(i, j) and further to f(i, m), and, further, according to the number of pixels of the display unit 20 (the resolution of the screen image in the horizontal direction), the echo data is stored from f(1, 0) to f(1, j) and further to f(1, m). Note that, at the time of initial operation (activation), the image memory is not stored with any echo data, and a background color (e.g., black) is displayed on the display screen. As the time elapses, the data is sequentially updated from i=0 to i=1. When the echo data is updated as many times as or more than the largest number of pixels in the horizontal direction, the oldest data is sequentially erased.

Here, the signal processor 18 includes an interference detecting module 181 and a display signal creating module 182. The interference detecting module 181 and the display signal creating module 182 perform interference detection processing and the interference removal processing, respectively. The interference detecting module 181 of this embodiment performs the interference detection processing by being switched among three modes (high, medium and low modes) with different interference detection sensitivities, according to the number of detected interference (interference signals).

Figure 4:
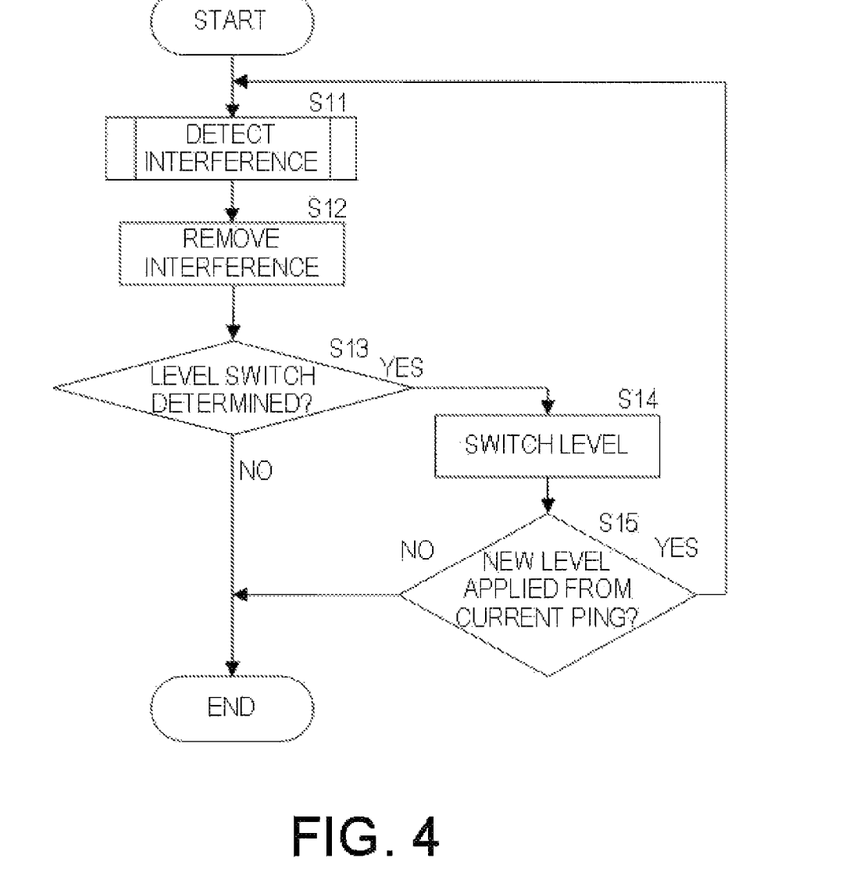
FIG. 4 is a flowchart showing interference detection, interference removal, and switching operation.

FIG. 4 is a flowchart showing the interference detection, the interference removal, and the switching operation. The interference detection, the interference removal, and the switching operation are performed for every ping (at a time point that the data for one ping is accumulated in the image memory). First, the interference detecting module 181 performs the interference detection processing in one of the three modes above (S11). For example, the interference detection is performed in the low mode in the first processing at the time of activation, and the mode is passed onto the processing of the next ping sequentially. The contents of processing in each mode are described in detail below.

The display signal creating module 182 removes the interference signal detected by the interference detecting module 181 (S12). Subsequently, the interference detecting module 181 performs a mode level switch determination according to the number of detected interference signals (the number of removed interference signals) (S13). For example, when the number of interference signals is zero, or when the number of interference signals is extremely small with respect to the total number of the reception signals for one ping (e.g., below 1%), the mode with the lowest interference detection sensitivity (low mode) is selected, and when the number of interference signals is extremely large with respect to the total number of the reception signals for one ping (e.g., above 50%), the mode with the highest interference detection sensitivity (high mode) is selected. When the number of interference signals is extremely small, such as when the number of interference signals is zero, although the interference detection processing may be omitted, in the low mode described in detail below, because the data of the signals other than interference is rarely false determined as interference, the interference detection processing is desired to be performed in any case.

Note that, the boundary number of interference signals for a case of switching the mode from the low mode to the medium mode and a case of switching the mode from the medium mode to the low mode may be different. For example, if the low mode is currently selected, the mode may be switched to the medium mode when the number of interference signals is above 5% with respect to the total number of the reception signals, and if the medium mode is currently selected, the mode may be switched to the low mode when the number of interference signals is below 1%. Similarly, conditions may be set, for example, if the high mode is currently selected, the mode may be switched to the medium mode when the number of interference signals is below 20%, and if the medium mode is currently selected, the mode may be switched to the high mode when the number of interference signals is above 50%.

Note that, the number of interference signals may be either one of the total number of pixels carrying the data determined as interference and, by defining a series of interference as a group of interference as a whole, the number of groups of the interference. In this case, a signal having an extremely low intensity (e.g., a signal having an intensity below a minimum value of a display dynamic range) is preferably excluded from the number of interference signals. For example, when a large number of interference signals having extremely low intensities exist, most of the interference signals may not be recognized on the display screen. In this case, the mode level for the interference removal is preferably not switched. Therefore, the signal having the extremely low intensity is excluded from the number of interference signals and keeps the current mode level for the interference removal.

When the interference detecting module 181 determines that the condition for changing the mode level is satisfied at Step S13, it performs the mode level switch processing (S14), and then determines whether to apply the switched mode from the current ping (S15). When the switched mode is applied from the current ping, the processing is repeated from Step S11 and the interference detection and removal are performed again. As above, when the switched mode is applied from the current ping, because the interference detection and removal are performed again in this switched mode, the application of the switched mode from the current ping is effective when a large number of interference exist. When the switched mode is applied from the next ping, the echo data can be displayed promptly.

Figure 5:
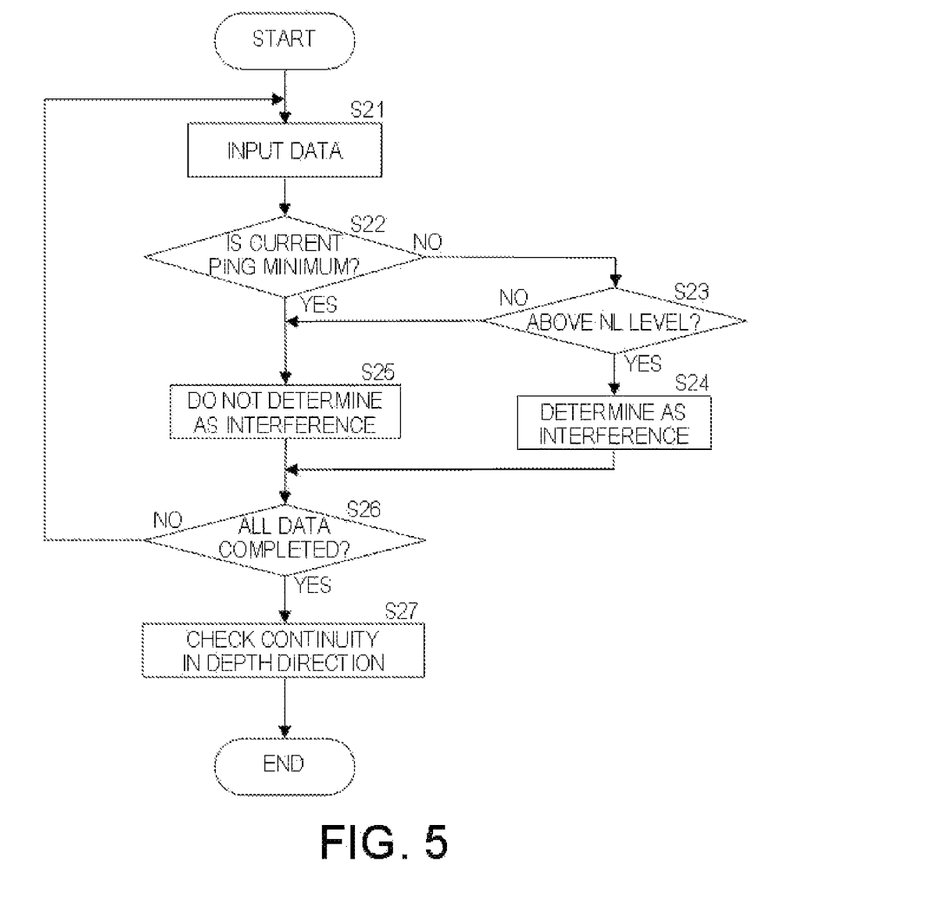
FIG. 5 is a flowchart showing interference detecting operation in a high mode.

Next, the modes of the interference detection are explained with reference to FIGS. 5 to 7. First, FIG. 5 is a flowchart showing the interference detection operation in the high mode.

First, the interference detecting module 181 reads out the echo data stored in the image memory and inputs it to the display signal creating module 182 (S21). Here, the echo data for the current ping and the previous ping, the two pings before, the three pings before (hereinafter, may simply be referred to as "the three previous pings") are read out. Further, the interference detecting module 181 compares the echo data for the current ping with the other echo data at the same depth for a plurality of pings and determines whether it has the minimum intensity thereamong (S22).

For the echo data in each pixel for the current ping among all the echo data inputted from the interference detecting module 181, when the echo data for the current ping does not have the minimum intensity, the interference detecting module 181 further determines whether the intensity of the echo data is above a threshold NLlevel (S23). A value for being discriminated from a low intensity component, such as noise, is set for the threshold NLlevel in advance. When the echo data for the current ping does not have the minimum intensity and the intensity thereof is above the threshold NLlevel, it is determined as interference (S24), and when the echo data for the current ping has the minimum intensity and/or the intensity thereof is below the threshold NLlevel, it is not determined as interference (S25). As shown in Equation 1 below, in a case where f(i, j) has the intensity higher than either one of f(i−1, j), f(i−2, j) and f(i−3, j) and the intensity thereof is above the threshold NLlevel, it is determined as interference and the echo data g(i,j)=1 is created. In other cases, the f(i, j) is not determined as interference and the echo data g(i, j)=0 is created.

$$f(i,j) - \Box f(i-j,), f(i-2j,), \text{ or } f(i-3,j) \Box \Box 0 \text{ and } f(i,j) \Box \text{NLlevel} \Box g(i,j)=1 \quad (1)$$

Note that, a value obtained from equalizing a plurality of sample data in the depth direction (e.g., three depth points j−2, j−1 and j) may be used as the data for the comparison in each pixel. Further, the data to be compared is not limited to the echo data for the three previous pings, and the echo data for a further previous ping may be used, and alternatively, the comparison may be performed among further less number of pings (e.g., between the current ping and the previous ping).

The interference detecting module 181 performs the above determinations for all the pixels (S26), and finally, determines continuity of interference in the depth direction (S27). In other words, the number of continuous pixels in the depth direction determined as interference is counted. Specifically, the interference detecting module 181 performs a calculation based on the following Equation 2 to calculate the number of interference within a reference range in the depth direction.

$$\text{sum}(i, j) = \sum_{n=0}^{width-1} g(i+n, j) \quad (2)$$

Here, the width indicates the range in the depth direction to serve as a reference to determine whether there is continuity. The total number of groups of echo data g(i, j)=1 within n=0 to width-1 is calculated. Further, the interference detecting module 181 extracts the group continuous over the reference range in the depth direction. In other words, the group where the sum value sum(i, j) of the number of the interference is above a threshold is set as g'(i+n, j)=1, and the group where the sum value sum(i, j) of the number of the interference is below the threshold is set as g'(i+n, j)=0. Further, the interference detecting module 181 determines that the reception signals corresponding to the group where g'(i+n, j)=1 are all interference signals, and does not determine that the reception signals corresponding to the group where g'(i+n, j)=0 are the interference signals.

Note that, in consideration of some extent of error, even when the data in only one pixel is not determined as interference (one dropped point), it is preferably determined as continuous. Further, the number of dropped points to be determined as continuous is not limited to the minimum resolution value of in the depth direction (one dropped point), and may suitably be set by defining a predetermined reference number corresponding to a plurality of pixels, according a desired accuracy.

Figure 6:
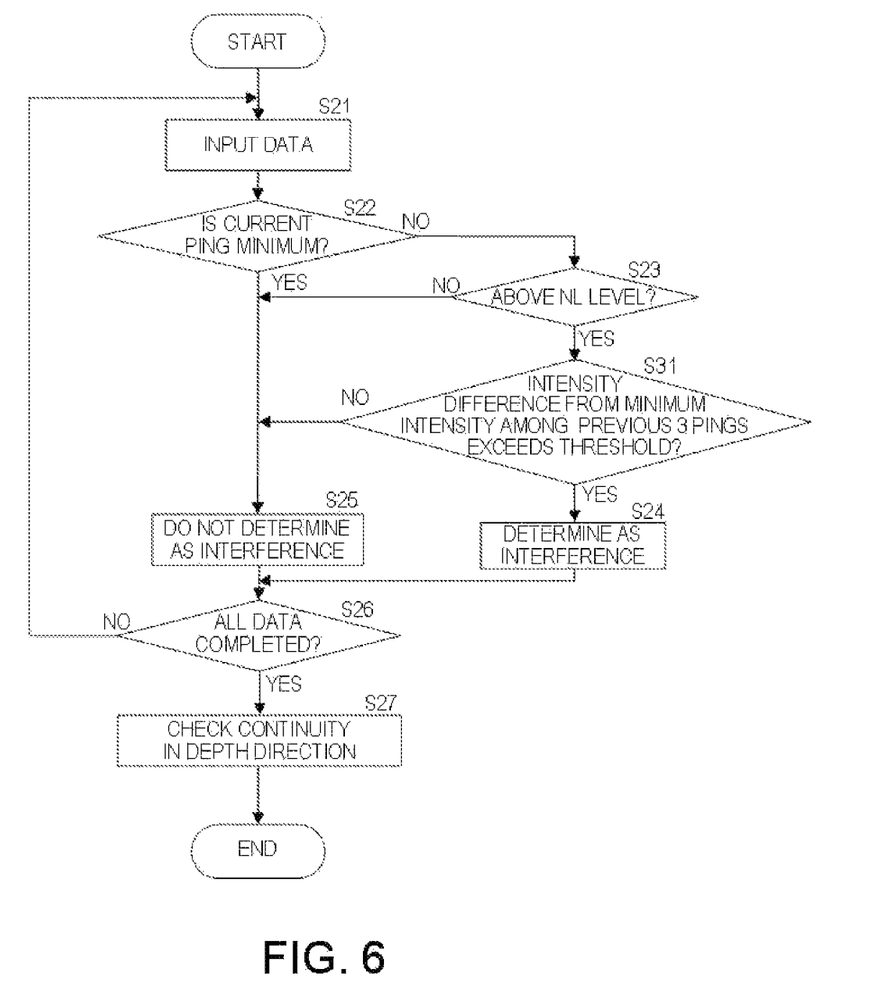
FIG. 6 is a flowchart showing interference detecting operation in a medium mode.

FIG. 6 is a flowchart indicating the interference detecting operation in the medium mode. The interference detecting operation in the medium mode is similar to the interference detecting operation in the high mode shown in FIG. 5 excluding the difference describe as follows.

When, at Step S22, the interference detecting module 181 compares, for each pixel, the echo data for the current ping with the echo data for the previous three pings and determines that the echo data for the current ping does not have the minimum intensity, and further determines that the intensity thereof is above the threshold NLlevel at Step S23, further the interference detecting module 181 obtains a difference (intensity difference) between the intensity of the data for the current ping and the minimum intensity among the data for the previous three pings. The interference detecting module 181 determines whether the intensity difference exceeds a predetermined threshold th (S31). When the difference with the minimum intensity among the data for the previous three pings exceeds the threshold th, the interference detecting module 181 determines the echo data for the current ping as interference and creates g(i, j)=1 (S23), and in other cases, it does not determine the echo data for the current ping as interference and creates g(i, j)=0 (S24). The threshold th may suitably be changed according to a required sensitivity. The interference detecting module 181 performs the determinations described above for all the pixels (S26), and finally determines the continuity in the depth direction (S27).

As above, the interference detecting operation in the medium mode includes a condition of whether the difference (intensity difference) between the intensity of the data for the current ping and the minimum intensity among the data for the previous three pings exceeds the predetermined threshold th in addition to the interference detecting operation in the high mode, therefore, the sensitivity in interference detection in the medium mode is relatively lower than the interference detecting operation in the high mode.

Figure 7:
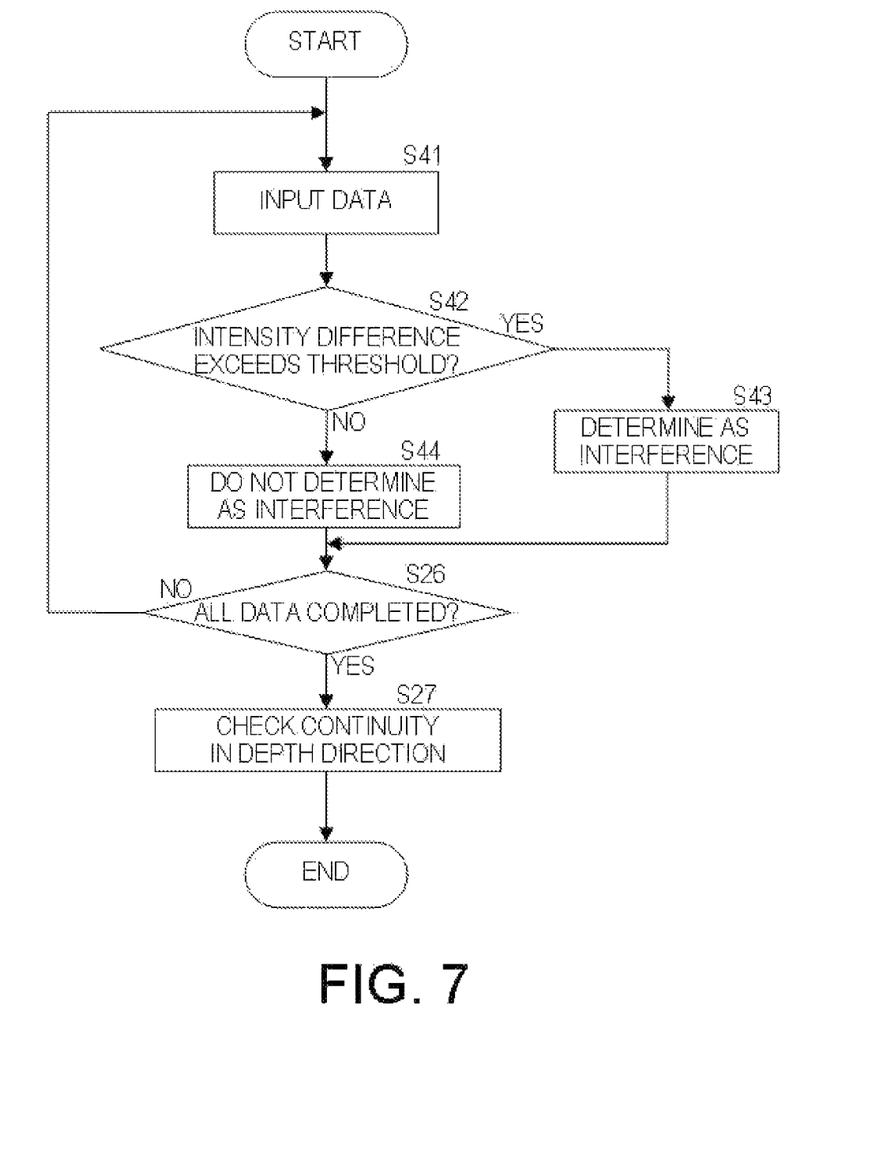
FIG. 7 is a flowchart showing interference detecting operation in a low mode.

FIG. 7 is a flowchart showing the interference detecting operation in the low mode. The interference detecting operation in the low mode is different from the determination processing in FIGS. 5 and 6, and is performed as follows.

First, the interference detecting module 181 reads out the echo data for the current ping and the previous ping from the image memory (S41), and determines whether the difference (intensity difference) between the intensity of the data for the current ping and the intensity of the data for the previous ping at the same depth exceeds a predetermined threshold (S42). When the difference with the intensity of the data for the previous ping exceeds the threshold th, the interference detecting module 181 determines the data for the current ping as interference and creates g(i, j)=1 (S43), and in other cases, the interference detecting module 181 does not determine the data for the current ping as interference and creates g(i, j)=0 (S44). The threshold th may be the same as or different from the threshold th used in the interference detecting operation in the medium mode. The threshold th may suitably be changed according to a required sensitivity in the interference detecting operation in the low mode. The interference detecting module 181 performs the determinations described above for all the pixels (S26), and finally determines the continuity in the depth direction (S27).

As above, the interference detecting operation in the low mode is the processing of determining the data for the current ping as interference only when the intensity difference between the pings is extremely large, and therefore, it has the lowest sensitivity in interference detection in this embodiment. By suitably setting the threshold th, the component that is not interference is hardly false determined as interference.

Note that, in the above example, the difference calculation is performed to obtain the intensity difference; however, a ratio of intensity may be used and, alternatively, a differential component may be extracted.

Further, the display signal creating module 182 performs the interference removal processing based on the following Equation 3 so as to remove the interference group detected by the interference detecting module 181 (S12 in FIG. 4).

$$\begin{cases} g'(i+n, j) = 0 : f'(i, j) = f(i, j) \\ g'(i+n, j) = 1 : f'(i, j) = \{f(i, j-1) + f(i, j+1)\}/2 \end{cases} \quad (3)$$

That is, the echo data in a group that is not interference is remained as it is, and each echo data in the group determined as interference is replaced with a value obtained by averaging the previous and the next echo data. The echo data f(i, j) after the interference removal processing is outputted to the display processor 19 and is displayed as an image. Note that, the interference removal processing is not limited to averaging the previous and the next echo data, but it may simply be replacing the interference data with the echo data from the previous measurement. Especially, when the interference detection and removal are performed in real time for every measurement, the interference removal is not performed by replacing with the averaged value using the previous and the next echo data but by replacing with the echo data from the previous measurement. The interference detection and removal may be performed for all the pixels to be displayed on the display unit 20 after the echo data for a plurality of extra measurements is accumulated. However, when processing in real time, the interference detection is performed by using the echo data from the current ping and the past ping, and the interference area is replaced with the echo data from the past ping (e.g., previous ping).

Note that, in the above example, the mode for the interference detection is switched among the three levels; however, the mode may be switched between two levels or among four levels or more.

Further, in the above example, the sensitivity in interference detection is switched by switching the mode among the three different levels; however, even by changing the repeating times of interference detection and removal in the same mode of interference detection, the sensitivity in interference detection can be switched. For example, the interference detection and removal may be repeated three times in the high mode, twice in the medium mode, and once in the low mode.

In this case, although the interference detecting operation may be in any mode, when the sensitivity in interference detection is high, even one time of interference removal is performed sensitively; therefore, similar to the case of determining the data as interference only when the intensity difference between the pings is extremely large, the sensitivity in interference detection is desired to be low.

Figure 8A:
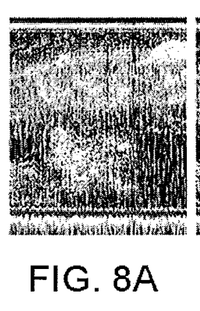
FIGS. 8A to 8L are views showing examples of screen images displayed on a display unit 20.
Figure 8B:
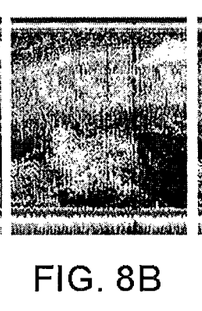
Figure 8C:
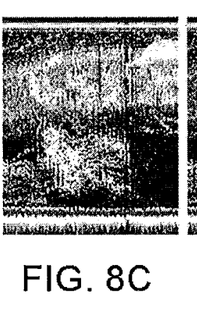
Figure 8D:
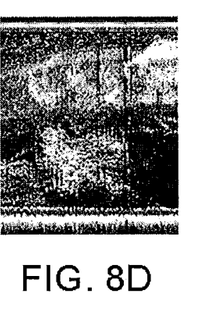
Figure 8E:
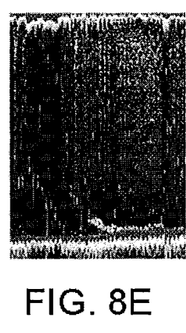
Figure 8F:
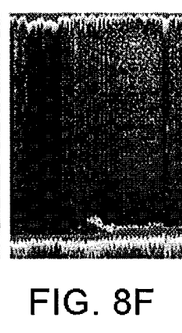
Figure 8G:
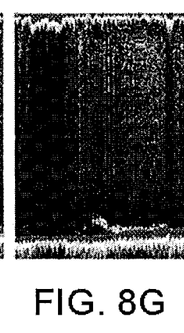
Figure 8H:
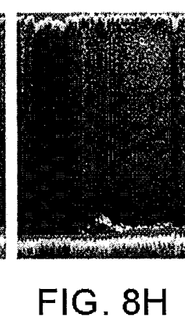
Figure 8I:
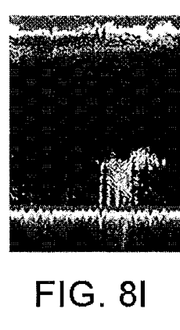

FIGS. 8A to 8L show comparative examples of images when the interference detection and removal are performed as described above. Note that, the images are merely examples (simulation) for the explanation, and not based on actual measurements underwater. FIGS. 8A, 8E and 8I are views showing image examples when the echo data before the interference detection is outputted. The example in FIG. 8A is for when the extremely large number of interference exist, the example in FIG. 8E is for when the reasonable number of interference exist, and the example in FIG. 8I is for when the extremely small number of interference exist.

For the example of FIG. 8A, FIG. 8B is the view showing the image example after the interference detection and removal are performed in the low mode, FIG. 8C is the view showing the image example after the interference detection and removal are performed in the medium mode, and FIG. 8D is the view showing the image example after the interference detection and removal are performed in the high mode. Similarly, for the example of FIG. 8E, FIG. 8F is the view showing the image example after the interference detection and removal are performed in the low mode, FIG. 8G is the view showing the image example after the interference detection and removal are performed in the medium mode, and FIG. 8H is the view showing the image example after the interference detection and removal are performed in the high mode. For the example of FIG. 8I, FIG. 8J is the view showing the image example after the interference detection and removal are performed in the low mode, FIG. 8K is the view showing the image example after the interference detection and removal are performed in the medium mode, and FIG. 8L is the view showing the image example after the interference detection and removal are performed in the high mode.

Figure 8J:
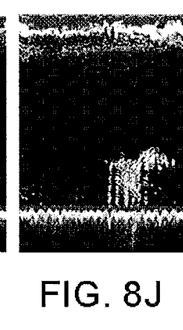
Figure 8K:
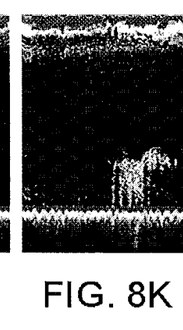
Figure 8L:
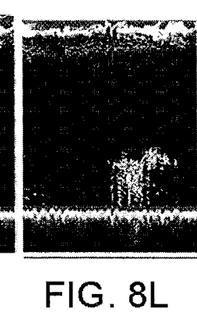

As shown in FIGS. 8A to 8L, in a case where the extremely large number of interference exist, interference may remain in either one of low and medium modes. Whereas, in a case where the extremely small number of interference exist, the component that is not interference may be false determined as interference in either one of high and medium modes. In this regard, the interference detection and removal of this embodiment are performed by switching the mode among low, medium and high according to the number of the interference signal components. Therefore, for example, in the case where the extremely large number of interference exist, as shown in FIG. 8D, interference is appropriately removed by using the high mode, in the case where the extremely small number of interference exist, as shown in FIG. 8J, the component that is not interference is not removed by using the low mode, and in the case where the reasonable number of interference exist, as shown in FIG. 8G, the component that is not interference is not removed more than needed while removing interference to some extent by using the medium mode.

Note that, in this embodiment, the example is described that the sensitivity in interference detection is switched based on the number of interference for each ping; however, the sensitivity in interference detection may be switched based on the number of interference for a plurality of pings. For example, the sensitivity may be switched when the number of data continuous in the depth direction, which is determined as interference, is above a predetermined threshold, or the sensitivity may be switched when the number of data determined as interference is averaged over a plurality of pings and the averaged number of interference data is above a predetermined threshold.

Note that, in this embodiment, the interference detection and removal are performed after the reception signal stored in the memory 17 is consolidated as the echo data to be displayed; however, the interference detection and removal may be performed by using the reception signal stored in the memory 17 as it is. In this regard, in the fish finder, an operator visually determines whether it is interference or the target object from the echo image on the display unit in the end, therefore, performing the interference detection and removal per pixel to be displayed is desirable in the sight of processing load and accuracy.

Further, in this embodiment, the example that the interference detection and removal are performed by the signal processor 18; however, the interference detection and removal may be performed by the controller 14, or by a hardware serving as a dedicated interference detecting module.

Furthermore, in this embodiment, the fish finder is described; however, the present invention can be applied to other devices, such as a radar apparatus, where interference may be generated.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A detection device, comprising:
    a transceiver configured to transmit a transmission signal and receive an echo caused by the transmission signal to output a measurement according to an intensity of the echo, wherein the measurement includes a plurality of reception signals; and
    an interference detector configured to detect interference signals from the plurality of reception signals associated with one measurement, perform first interference detection processing having a first interference detection sensitivity upon detecting that a number of the reception signals from the one measurement detected as the interference signals is greater than zero and below a predetermined threshold, and perform a switching operation of switching between the first interference detection processing and second interference detection processing that has a second interference detection sensitivity higher than the first interference detection sensitivity used in the first interference detection processing upon detecting that the number of the reception signals from the one measurement detected as the interference signals is at least equal to the predetermined threshold.

2. The detection device of claim 1, wherein the first interference detection processing uses a different mode of interference detection from the second interference detection processing.

3. The detection device of claim 1, wherein the first interference detection processing uses the same mode of interference detection as the second interference detection processing but a repetition of interference detection processing thereof is different.

4. The detection device of claim 2, wherein the first interference detection processing includes processing for detecting that the reception signal from a current measurement is the interference signal when an intensity difference between the reception signal from the current measurement and the reception signal from a previous measurement is above a first intensity difference threshold, and
    wherein the second interference detection processing includes processing for detecting that the reception signal from the current measurement is the interference signal when the reception signal from the current measurement has a higher intensity than that of the one or more reception signals from one or more previous measurements and above a predetermined intensity threshold, and an intensity difference between the reception signal from the current measurement and the reception signal having a lowest intensity in the one or more previous measurements is above a second intensity difference threshold.

5. The detection device of claim 2, wherein the first interference detection processing includes processing for detecting that the reception signal from a current measurement is the interference signal when the reception signal from the current measurement has a higher intensity than that of one or more reception signals from one or more previous measurements and above a predetermined intensity threshold, and an intensity difference between the reception signal from the current measurement and the reception signal having a lowest intensity in the one or more previous measurements is above a first intensity difference threshold, and
    wherein the second interference detection processing includes processing for detecting that the reception signal from the current measurement is the interference signal when the reception signal from the current measurement has the higher intensity than that of the one or more reception signals from the one or more previous measurements and above the predetermined intensity threshold.

6. The detection device of claim 1, wherein the interference detector performs the switching operation when the number of the reception signals from one measurement detected as the interference signals is above a predetermined threshold.

7. The detection device of claim 1, wherein the interference detector performs the switching operation when the number of the reception signals from a plurality of measurements detected as the interference signals is above a predetermined threshold.

8. The detection device of claim 7, wherein the interference detector performs the switching operation when the number of the reception signals detected as the interference signals continuously at the same depth is above a predetermined threshold.

9. The detection device of claim 7, wherein the interference detector averages the numbers of the reception signals over the plurality of measurements and, when the averaged number of the reception signals is above a predetermined threshold, the interference detector performs the switching operation.

10. The detection device of claim 1, wherein the interference signal is formed with a plurality of reception signals continuous over a reference depth range in the one measurement.

11. A non-transitory computer readable media configured to store a computer executable program, which upon execution by a processor of a computer causes the computer to allow a detection device to perform processing according to a method, comprising:

causing a computer to transmit a transmission signal and receiving an echo caused by the transmission signal to output a measurement according to an intensity of the echo, wherein the measurement includes a plurality of reception signals; and causing a computer to detect interference signals from the plurality of reception signals associated with one measurement, perform first interference detecting processing having a first interference detection sensitivity upon detecting that a number of the reception signals from the one measurement detected as the interference signals is greater than zero and below a predetermined threshold to remove the interference signals, and perform a switching operation of switching between the first interference detection processing and second interference detection processing that has a second interference detection sensitivity higher than the first interference detection sensitivity used in the first interference detection processing upon detecting that the number of the reception signals from the one measurement detected as the interference signals is at least equal to the predetermined threshold to remove the interference signals.

* * * * *